United States Patent [19]

Röhm

[11] Patent Number: 4,507,699
[45] Date of Patent: Mar. 26, 1985

[54] PROTECTIVE DEVICE FOR THE WELDING CIRCUIT OF WELDING POWER SOURCES

[75] Inventor: Ernst Röhm, Frankfurt am Main, Fed. Rep. of Germany

[73] Assignee: Messer Griesheim GmbH, Frankfurt am Main, Fed. Rep. of Germany

[21] Appl. No.: 450,750

[22] Filed: Dec. 17, 1982

[30] Foreign Application Priority Data

Dec. 30, 1981 [DE] Fed. Rep. of Germany ....... 3151864

[51] Int. Cl.³ .............................................. H02H 3/38
[52] U.S. Cl. ......................................... 361/50; 361/42
[58] Field of Search ....................... 361/42, 50, 47, 48, 361/49

[56] References Cited

U.S. PATENT DOCUMENTS 3,987,796 10/1976 Gonser ............................. 361/42 X
4,187,525 2/1980 Nagura et al. ......................... 361/42

FOREIGN PATENT DOCUMENTS

162149 12/1979 Japan ..................................... 361/42
0629586 9/1978 U.S.S.R. ............................... 361/42

Primary Examiner—Reinhard J. Eisenzopf
Attorney, Agent, or Firm—Connolly and Hutz

[57] ABSTRACT

A system to prevent a dangerous contact voltage in a welding apparatus by providing a protective device for cutting off the power for welding. The welding system has a power source including a primary circuit and a secondary circuit. An electrode receiving the power welds workpieces which are successively inserted and removed into electrical contact in the welding system. A protective ground is provided between the housing for the power source and ground. To prevent dangerous grounding during the welding operation, there is connected between the workpiece lead in the secondary and the housing a device which monitors both the current to the protective wire ground and the voltage between the workpiece lead and the housing. This monitor device controls a power cut-off switch. The current is monitored through a current sensor which is connected to the monitor device and the current sensor is also connected in series between the housing and the protective ground. In this way, it is possible to disconnect the power to the electrode when predetermined circuit and voltage limits are exceeded.

4 Claims, 8 Drawing Figures

| | | | | | $U_{B1}$ | $U_{B2}$ | | | |
|---|---|---|---|---|---|---|---|---|---|
| 1 | 15-G | X | X | (circuit) | — | — | X | X | |
| 2 | 15-20 | | X | (circuit) | — | $U_1 + U_0$ | X | | X |
| 3 | 15-20 | X | | (circuit) | — | — | X | X | |
| 4 | 16-19 | | X | (circuit) | — | $U_1$ | X | | X |
| 5 | 16-19 | X | | (circuit) | — | — | X | X | |

PROTECTIVE DEVICE FOR THE WELDING CIRCUIT OF WELDING POWER SOURCES

The invention concerns a protective device for the welding power sources.

In all countries where protective measures are taken to prevent the retention of excessive contact voltages of contactable, electrically conductive parts of electrical devices, machines, and installations in case of malfunctions, this is accomplished on the basis of generally known directives. These directives are also applicable for such operational materials for light arc welding as power sources, mobile wire feed devices etc., as well as for the total light arc welding installation.

The VDE directives 0541/9.71, "Regulations Concerning Power Sources for Light Arc Welding with Alternating Current" [Bestimmungen für Stromquellen zum Lichtbogenschweissen mit Wechselstrom] and 0544, Part 99/July 1979 "Welding Installations and Materials for Light Arc Welding" [Schweisseinrichtungen und Betriebsmittel für das Lichtbogenschweissen] (derived from the CENILEC standardization document 'Harmonisierungsdokument HD 362' of June, 1977) require that power sources for welding must correspond to protection class I or II. Protection class I is applicable for welding power sources with metal housing, i.e. all contactable, conductive parts, which, in case of malfunction of the insulation, could become possessed of grounded, voltage which would be hazardous to humans, are to be connected to protective conductor, by means of which they are included in a protective system to prevent excessive contact voltage, e.g. according to VDE 0100/5.73.

Corresponding special directives do not exist for the totality of the welding installation, in the operation of which the user is particularly jeopardized in case of a malfunction; instead, the general directives for all electrical devices and installations are the only applicable regulations.

Those protective measures can be applied to Protective Class I which are cited in VDE 0100 against excessive contact voltage and which require the presence of a protective conductor connection.

The assumption must be made that the welding power source and related other materials, e.g. a wire feed device, or the torch, most frequently do not have a specific fixed location but are executed so that they can be moved out, set up, and connected, and so that the work piece, on which the welding is performed, is constantly being exchanged. There are protective measures, according to which and in compliance with the grounding regulation and requirement. The "body" i.e. the non active, contactable parts which are live in case of a malfunction is directly connected with ground, since under practical conditions, this grounding cannot be achieved with the necessary reliability. The only remaining precaution is the "zeroing" which has consequently long been applied everywhere almost without exceptions. The application of Protection Class II— protective insulation by means of insulating the housing or covers—is generally limited to certain employment of transformers for small welding tasks only. Due to the nature of the process, protective insulation is also impossible for the work piece, which is also to be protected against excessive contact voltages.

Figure 1:
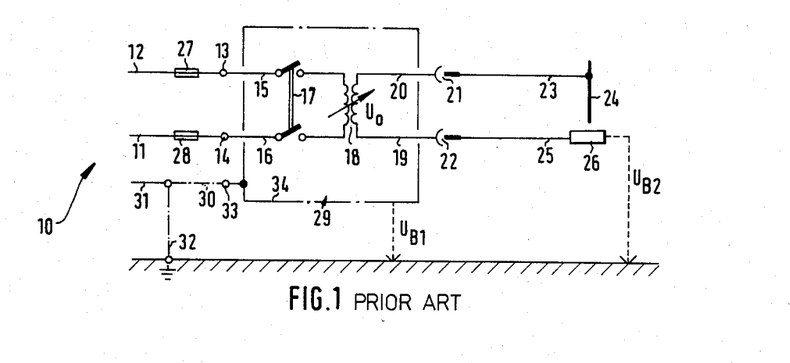
FIG. 1 shows a welding device circuit with a protective device of an embodiment showing the state of the art.

FIG. 1 shows a welding device 10 in its simplest form, with "zeroing" protection, which has been assumed, in the application, to represent the state of the art. Generally, the known welding device 10 consists of the outer mains 11, 12 of the AC supply, which are connected via the power source contacts 13, 14 with the primary lines 15, 16 at an on/off switch or contactor 17, which, in the "on" position, closes the welding circuit over the main transformer 18 with the secondary lines 19, 20, the electrode connection 21, the work piece connection 22, the electrode line 23 with the electrode 24, and the work piece line 25 with the work piece 26. In line with the outer mains 11, 12, there are safety fuses or automatic fuses 27, 28, which secure the primary circuit of the welding device 10 against overload. The power source housing 34 of the welding power source 29 is grounded by means of a protective conductor 30, the neutral conductor 31, and the protective conductor 32. The connection 33 of the protective conductor 30 is made at the power source housing 34 of the welding device 10. The contact voltage between housing and ground is indicated with $U_{B1}$ and the contact voltage between work piece and ground with $U_{B2}$.

Figure 2A:
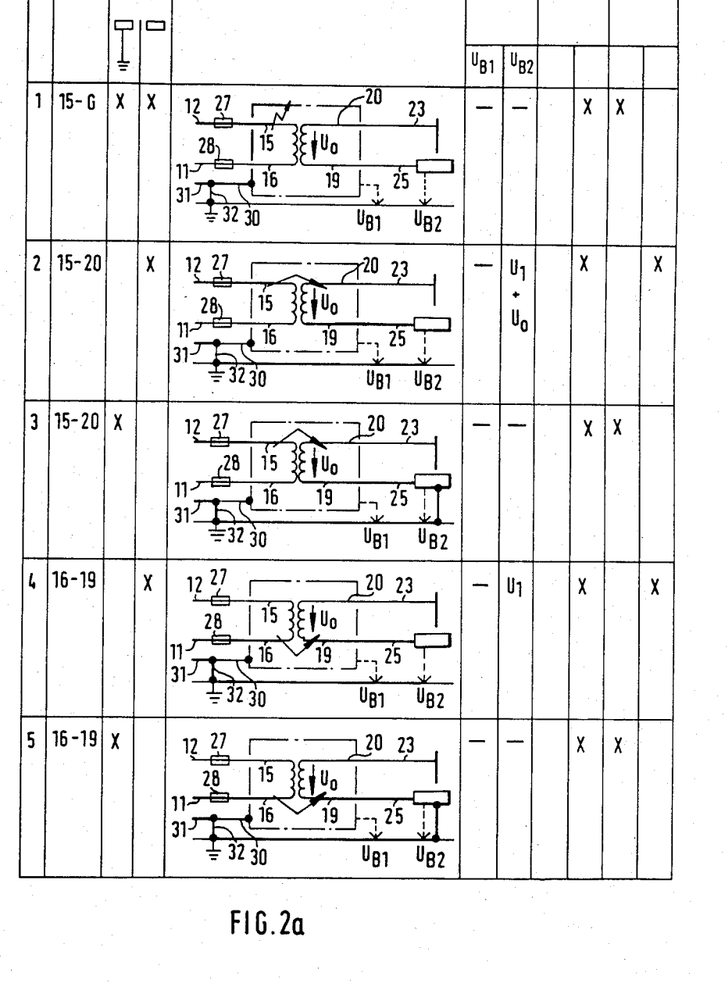
FIGS. 2a, 2b, 4a, 4b show Tables 1 through 20 illustrating various malfunctions of welding device circuits.
Figure 2B:
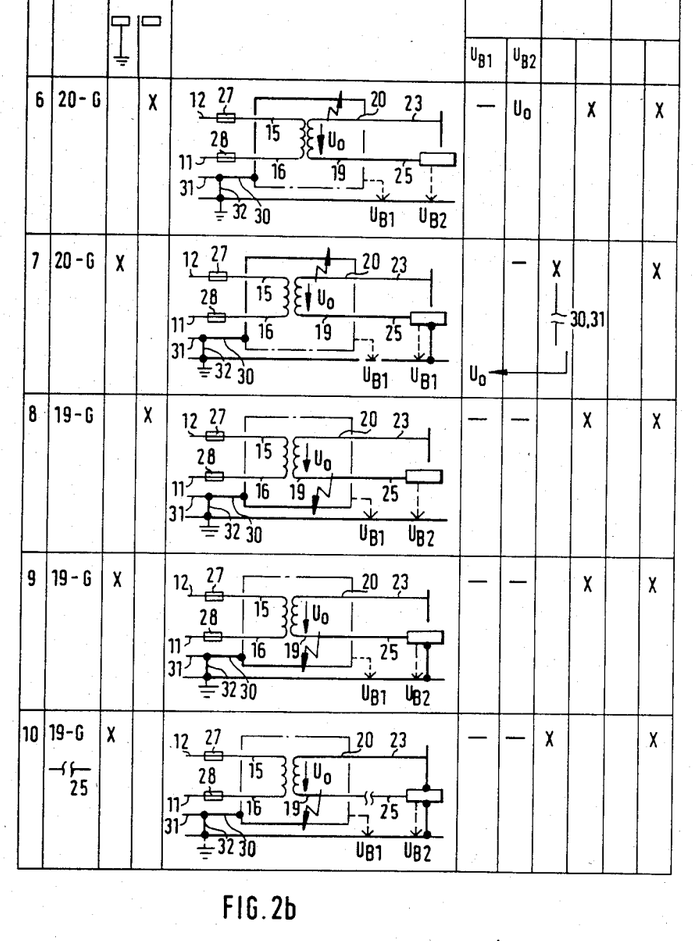

FIGS. 2a and 2b show the malfunctions which are, in principle, possible in the power source.

The connection from work piece to ground which is entered in cases 3, 5, 7, 9 and 10 does not represent a intentional established "grounding" but results from the arrangement and position of the work piece itself or is created by the protective conductor of a welding table or a device supporting the work piece, or an electric tool in conductive connection with the work piece.

However, the work piece can also be positioned without grounding, e.g. supported on wooden stands, or on a non-conductive surface.

It can be seen that a dangerous contact voltage—in most cases, the non-load voltage $U_o$ is greater than 65 V—will occur without activation of the "zeroing" [or neutralizing] precaution, namely in three cases (No. 2, 4, 6) at the ungrounded work piece, and in one case (No. 7) at the power source housing. In malfunction case No. 10, there is a danger of overload and, consequently, of burnout of the protective conductor, also without activation of the precautionary measure.

In spite of the fact that the conditions of Protection Class I have been met, the basic requirement is thus not fulfilled, namely to prevent the occurrence and retention of excessive contact voltage in case of malfunction.

In malfunction cases 8, 9, and 10 in Table 1, the connection between the line 19, i.e. thus also the entire wiring between the work piece and the transformer, and the protective conductor and the ground can be established not only by means of mass contact closing but also in other ways and with the same effect, e.g. by means of the following service errors (See directives for accident prevention, 26.0 Par. 30):

(a) Although the work piece line is connected to a work piece, the welding takes place on another work piece. Each one of the work pieces has a live connection with an electrical tool under Protection Class I.

(b) The work piece connection of the power source is not connected directly with the work piece but grounded over a heating element; the welding is performed on a work piece that is not grounded and which has a live connection with an electrical tool under Protection Class I.

(c) An overly high transfer resistance exists between the work piece support (e.g. welding table, rail) to which the work piece line is connected, and the work piece, which has live connection with an electrical tool under Protection Class I.

In malfunction case 10, the work piece line was interrupted e.g. if it was run over, or the operator forgot to connect it to the power source or to the work piece.

The VDE directives 0541 and 0544 Part 99 require merely Protection Class I, but not that other or additional precautionary measures be taken in order to achieve the desired protection goal, namely to protect the operator of a light arc welding device against too high contact voltages.

Although the accident prevention directives of the German unions—UVV 26.0 (VGB 15) entitled "Welding, Cutting, and Related Work Processes" [Schweissen, Schneiden und verwandte Arbeitsverfahren] of April 1, 1978—do describe malfunction case 7 in Table 1 (in Par. 30(5)/Cases 5 and 6), they do not directly state the requirement for a suitable precautionary measure in order to prevent the described cases.

For these reasons and practically without exception, no such precautionary measures have been applied to any installations for light arc welding and related processes, so that in the practice, too high contact voltage may occur without activating a protective measure.

The precaution known from electrical engineering, namely to protect a conductor from overload by means of a protection switch, can be applied here to the protective conductor of the welding power source. When activated, the protection switch turns off the primary contactor and thus also the welding power source. In malfunction cases 7 and 10 in Table 1, the protection switch is activated; however, it remains without effect in cases 2, 4 and 6, and the dangerous contact voltage remains.

In the German Patent No. 1540758, a relay is suggested, connected to the work piece line of the welding circuit, for the protection of the welding power source and other devices in the welding installation as well as for the welder himself, which relay when activated, turns off the welding power source. The relay will respond in all malfunction cases, where the work piece has voltage to the ground, thus in malfunction cases 2, 4 and 6 in Table 1.

However, the suggested solution has the following shortcomings:

(a) A fault current, as described in Column 1, lines 51–58 of the patent document, cannot occur, since there is no closed circuit.

(b) No fault current can flow from the plus pole over relay 15 and protective conductor 3 in the execution example represented in the drawing of the patent document and described from Column 2, line 46, since the work piece line (Column 3, lines 9–11) is interrupted, and there is consequently no closed circuit. Current over relay 15 will flow only when the work piece is grounded and the welding electrode has a live connection with the work piece either directly or via a light arc. However, the deactivation that will then occur is not required, since—as represented under (a) above—no current flow is possible without the relay 15.

(c) When the work piece line is interrupted at the plus pole rather than at the work piece, the relay 15 will not be activated.

(d) While, due to the high short-circuit current, the fuse in the power supply rapidly burns out under the activation of the protective measure "zeroing" in a malfunction case where it is activated, the relay 15 and, above all, the resistance 16—5–10 Ohm—must be reliably capable of withstanding the high welding power (according to said German Patent Document up to 7,000 A) until deactivation; they must not be destroyed in case of malfunction. Already at a fault current of 1,000 A, the resistance 16 must be capable of withstanding 5–10 megawatt at a voltage of 5–10 KV.

(e) In malfunction cases 3, 5, 7, 9 and 10, the serial switching 15–16 is bridged by the work piece grounding or the mass contact (Case 10) and is thus ineffective.

In malfunction case 7 in FIG. 2b, the protective conductor is subject to the high short-circuit current of the welding circuit; it burns through, and the precaution "zeroing" is unnoticeably cancelled. In malfunction case 10, the welding power, which is much too high for the protectice conductor, flows through it, with the same effect as in Case 7.

The purpose of the invention is to create a protective switching for the welding curcuit of welding power sources, which does not exhibit the above mentioned disadvantages, and which, in particular, eliminates the danger of excessive contact voltage being retained.

The problem is solved thereby that the work piece line of the welding circuit is connected to the housing via a voltage/power monitor [U-I-Wächter] and that the U-I-Monitor, which disconnects the power source in case of a disturbance, has an effective contact with a current sensor, which is connected to the protective conductor and the housing.

The protective device with the U-I-Monitor, which is effectively connected to a current sensor, guarantees safe disconnection of the welding power source in all malfunction cases where the contact voltage is too high (See Table 1).

In an additional execution for welding power sources with interchangeable connections for work piece and welding torch, the U-I Monitor is connected, within the welding power source, to the outer work piece line, via a measurement line.

In the following, the invention is described in greater detail with reference to embodiments which are illustrated in FIG. 3, FIGS. 4a and 4b, FIG. 5 and FIG. 6, whereby reference is also made to additional advantageous characteristics and designs.

Figure 3:
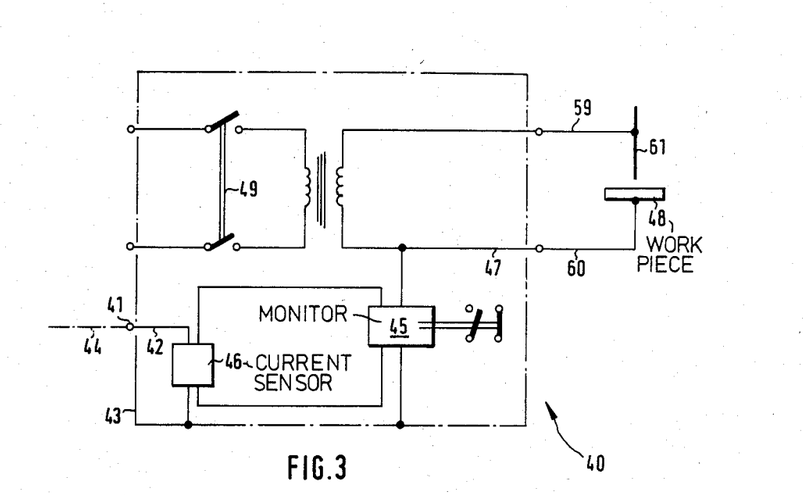
FIG. 3 shows a welding device circuit of an embodiment of this invention.

In the basic switching according to the invention in FIG. 3, a welding power source in its entirety is indicated as 40, whereby a simple welding transformer is represented as the basic switching according to FIG. 2. Welding power sources of different construction, e.g. welding converters of various embodiments, can also be used in the same way.

The precautionary measure "zeroing" is obtained by means of the protective conductor connection 41 with its inner connection line 42 to the housing 43. The protective conductor 44 and the line 42 are without current when undisturbed.

The U-I Monitor 45 measures the current occuring in the line 42 in a case of disturbance, via the current sensor 46 and also the voltage between the inner work piece line 47 and the housing 43, grounded via the protective conductor connection 41, and thus also the voltage of the openly contactable work piece 48 against the ground, which is generally the position of the welder. When the border values that can be set on the U-I Monitor 45 are exceeded, e.g. 3 A as protective conductor current and 10 V between the inner work piece line 47 and the housing 43, the power source 40 is disconnected, e.g. by means of a relay located on the U-I monitor 45 and activating the main contactor 49, or some other deactivation device. The danger is thus eliminated that in case of a malfunction, the protective conductor 44 would burn through and an excessive contact voltage would occur between work piece and ground.

It should be noticed that the U-I Monitor 45 reacts to all forms of current and voltage possible in case of a malfunction which, in respect to the voltage, is very easily feasible with the aid of currently common electrical or electronic devices. In order to encompass all possible current types in the sensor 46, a field plate converter is preferably used which affects the U-I Monitor in case of distorted and non-distorted alternating, direct, and mixed currents.

In the above-mentioned malfunction cases No. 2, 4 and 6, the dangerous contact voltage occurring at the ungrounded work piece 48 in case of malfunction, is detected by the U-I Monitor 45, and the welding power source 40 is turned off. The possible burn-out of the protective conductor 44 in case of malfunctions is prevented by the detection of the protective conductor current and the subsequent deactivation of the welding power source 40. The switching according to the invention fulfills the requirement that, in case of a malfunction of the insulation, the excessive contact voltage or the burn-out of the protective conductor be prevented also in such cases where the precautionary measure of "zeroing" is not activated.

In respect to power sources for welding under protective gas, the contacts to the welding power source for the torch and the work piece are different insofar that the welding torch must be provided not only with welding current but also with protective gas, cooling water, HF ignition voltage, control lines and, in the case of MIG/MAG, also with welding wire. The torch is connected either on a special terminal board or, more recently, a central plug-in-connection, which encompasses all that is needed.

A simple plug-in device for the welding cable is all that is required for the work piece line. A confusion of cables for torch and work piece, so that the work piece cable is connected to the contact provided for the torch, or vice versa, will thus not be possible.

In the case of welding power sources for bar electrode welding, welding current only is to be supplied to the electrode holder as well as to the work piece; the plug-in devices for electrode cable and work piece cable are identical. Thus, it could easily happen that the two are confused, either by oversight or, in the case of welding rectifiers, with the intention of obtaining the required polarity for the welding electrode.

Figure 4A:
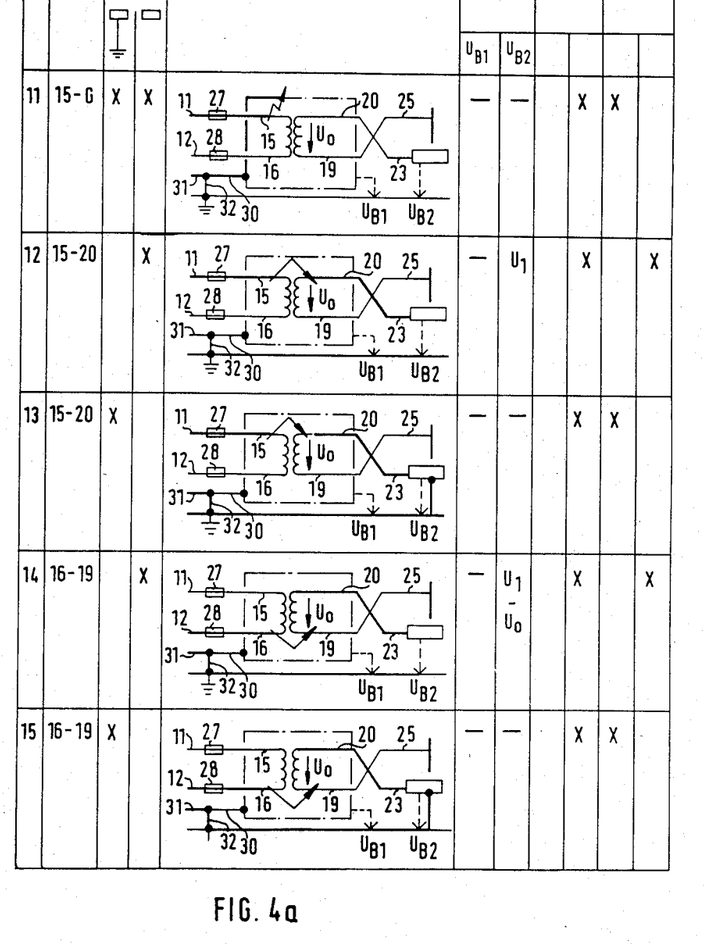
Figure 4B:
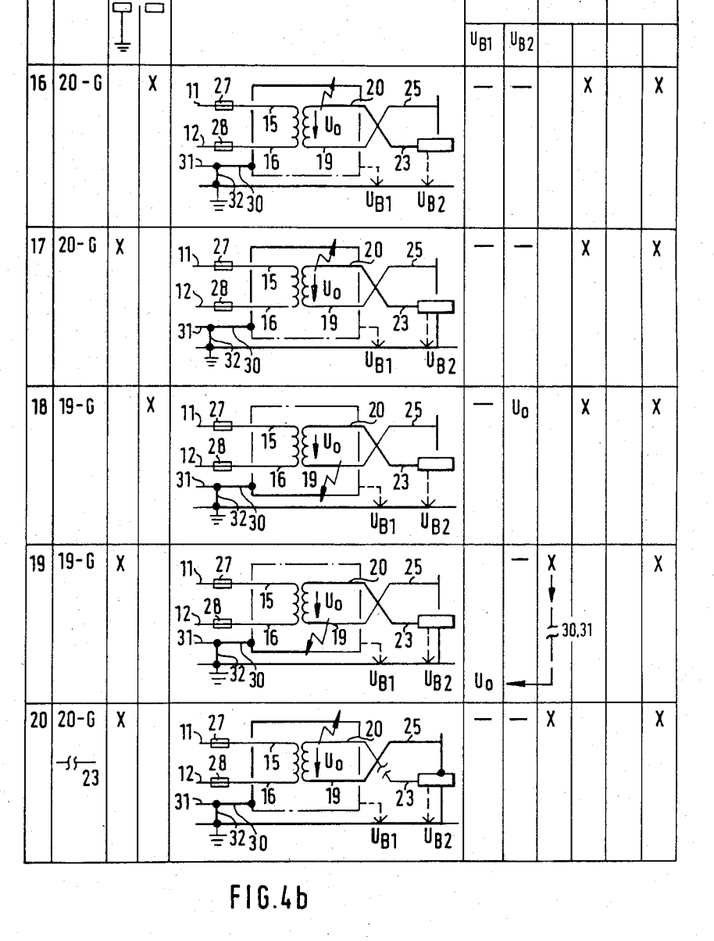

FIGS. 4a and 4b show the various malfunction cases according to FIGS. 2a and 2b for the case wherein the welding lines have been reversed. It can be seen that here as well, the precautionary measure "zeroing" does not always become effective. In three cases, the result is excessive contact voltage at the work piece, in one case at the housing. In two cases, the protective conductor is overloaded and burns through.

If the welding lines are reversed, the following changes will occur in the effect of the suggested protective device:

(a) If the work piece is grounded, the line 47 and consequently the U-I Monitor 45 will receive the voltage $U_o$ against ground, even without the malfunctions 13, 15, 17, 19 and 20 in FIG. 4; it responds and disconnects the welding power source. A welding operation is thus not possible.

(b) While in the cases 12 and 14 in FIG. 4, the protective switching is effective due to the fact that there is power on the U-I Monitor 45, the latter is not activated in case 18, but the contact voltage $U_o$ at the work piece 48 remains.

An advantageous embodiment of the basic switching according to the invention (FIG. 3) consists wherein an additional secondary measurement connection 50 is provided for welding power sources where the connections 59, 60 for work piece 48 and welding torch 61 may be reversed (FIG. 5), with fixed connection to the measurement line 51, which, in turn, is connected to the outer work piece line 60.

Figure 5:
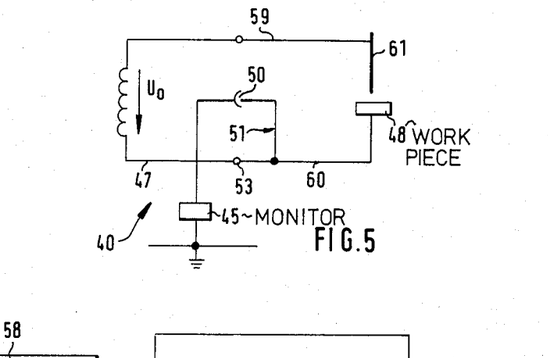
FIG. 5 shows a welding device circuit which illustrates a modified connection of the malfunction monitoring device.

The U-I Monitor 45 is then no longer connected to the inner line 47 but to the secondary measurement connection 50. Since it is thus always connected to the work piece 48, it will always be activated when the work piece 48 has voltage to ground, thus also in malfunction case 18. When the work piece 48 is grounded, the U-I Monitor 45 can now receive no more voltage, and the welding power source 40 is no longer disconnected without grounding.

Advantageously, the welding cable plug at the work piece line 60 is designed so that the connections of both the welding power line and the secondary measurement line 50 will occur simultaneously in one plug.

This switching will also guarantee that the electrode 61 can be arbitrarily set to plus or minus during DC welding, without loss of the effect of the protective switching.

Figure 6:
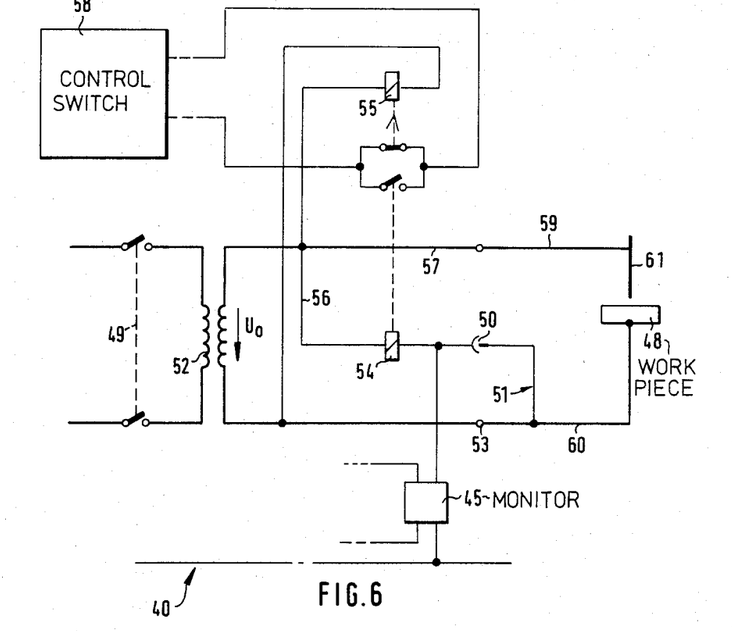
FIG. 6 shows a welding device circuit which illustrates a modified preventive connection of the work piece and electrode.

In order to ascertain that, firstly, the work piece 48 is always connected to the contact 53 provided for the work piece 48, which is also important for other reasons, e.g. for welding with several light arcs on one work piece 48, and secondly, that the secondary measurement contact 50 has been made correctly, it is suggested that the switching be expanded as illustrated in FIG. 6. Thereby, the measurement line 51 is connected to the electrode line 57 and contains a relay 54, by means of which a primary contactor control 58 for the welding power source 40 can be activated. Via secondary measurement contact 50, the additional relay 54 lies on $U_o$, a further relay 55 directly on the voltage $U_o$. The welding power source can be switched on in a known manner via the control switch 58 for the primary contactor 49. Thereby, relay 55 receives the voltage $U_o$ and opens its opener contact after a short delay. The contactor 49 remains set only when the relay 54 is set, thus, when the work piece line 60 and the secondary measurement contact 50 are correctly connected.

If the lines for the work piece and for the electrode are reversed, the contactor 49 will indeed be set via the opener of relay 55, but relay 54 receives no voltage and canot bridge the opening contact of relay 55—the welding power forces is switched off.

If the monitoring of the secondary measurement contact 50 is to allow welding operation even if the welding lines are reversed, the relay 54 and line 56 are not to be connected to line 57 but to a center tapping on the transformer 52, according to the switching shown in FIG. 6, so that the relay 54 receives the voltage $U_o/2$ in both cases and can be activated.

The suggested switchings according to FIGS. 3, 5, and 6 can also be realized with electronic means.

An object of this invention is to provide a circuit for a welding device having a protective system for switching off power to a welding device in the event of a malfunction including a current sensing and monitoring combination which measures the current with a malfunction, such that the power source to the welding device is switched off when an excessive voltage occurs.

BRIEF DESCRIPTION OF THE DRAWINGS

FIGS. 2a, 2b, 4a and 4b are diagrams showing voltage and current flow in case of protective action "zeroing" and in FIGS. 4a and 4b the torch and workpiece are reversed.

Contact voltage as used in this description refers to a condition which might be understood by the generalized electrical term of short circuit or a circuit through a small resistance, especially one that acts as shunt to a circuit with a larger resistance.

In the present description the reference to a line as an element will be understood to indicate a conductor. In the present description the term "zeroing" is also used under the term zeroize or neutralize (Dictionary of Engineering and Technology, Volume I Fourth revised and enlarged edition, Oscar Braudstetter Verlag KG, Wiesbacleu, Page (69) means; to establish a conductive connection with an earthed neutral conductor.

I claim:

1. A protective device in combination with a welding current source having a welding current circuit, said welding current circuit comprising an electrode lead, a workpiece lead, and electrode and a workpiece, said circuit being connected to a galvanically separated transformer-primary current circuit connected to a feed network, the improvement which comprises, said welding current circuit being connected to an enclosure which is connected through a connection means and a lead with a protective wire of the feed network whereby zeroing of said primary circuit is attainable, means protective of the welding current circuit connected between the workpiece lead and the enclosure comprising a voltage monitor having means for switching off the welding current source, means connecting the monitor to a current sensor and said current sensor being connected, on one hand, through said connection means and lead to said protective wire, and on the other, to said enclosure.

2. The combination as claimed in claim 1 a first terminal of said galvanically separated transformer-primary current circuit is connected to the electrode lead, a second terminal of said galvanically separated transformer-primary current circuit is connected to the workpiece lead.

3. The combination as claimed in claim 2 wherein said terminals of said galvanically separated transformer-primary current circuit connected to said electrode lead and workpiece lead are interchangeably connectible.

4. The combination as claimed in claim 2, including a control switch being adapted to control the supply of power to the transformer primary circuit, and a circuit for controlling said control switch, said circuit for controlling comprising:

(a) a first circuit means connected between said workpiece lead and said first terminal, (b) a first relay interposed in said first circuit means having an armature to open and close a contact connected to the control switch and which is operable for interconnecting said control switch;

(c) a second circuit means connected between said first and second terminals, (d) a second relay interposed in said second circuit means having an armature to open and close a contact connected to the control switch and which is operable for interconnecting the said control switch whereby the first and second relays are operable to interconnect the control switch so that the control switch is adapted to supply power to the transformer solely when said workpiece lead and workpiece are connected to the second terminal.

* * * * *